US006092796A

United States Patent [19]
Long et al.

[11] Patent Number: 6,092,796

[45] Date of Patent: Jul. 25, 2000

[54] MULTI POSITION PART HOLDER FOR ROBOTIC APPLICATIONS

[75] Inventors: Michael Long, Cary, N.C.; Camiel J. Raes, Phelps, N.Y.; Joseph E. Stagnitto, Rochester, N.Y.; James A. White, Conesus, N.Y.

[73] Assignee: Eastman Kodak Company, Rochester, N.Y.

[21] Appl. No.: 09/172,382

[22] Filed: Oct. 14, 1998

[51] Int. Cl.[7] ....... B23Q 3/08

[52] U.S. Cl. ....... 269/32; 269/63; 269/296

[58] Field of Search ....... 409/219–224; 74/815, 816; 269/58, 63, 69, 70, 71, 79, 296, 20, 24, 25, 32, 257, 258

[56] References Cited

U.S. PATENT DOCUMENTS

| | | | |
|---|---|---|---|
| 1,931,730 | 10/1933 | Klay | 269/71 |
| 2,536,239 | 1/1951 | Tyndall | 269/296 |
| 2,881,667 | 4/1959 | Ebert | 269/69 |
| 4,416,570 | 11/1983 | Argenbright | 269/61 |
| 4,653,739 | 3/1987 | Moore | 269/61 |
| 4,726,576 | 2/1988 | Siniko . | |
| 5,501,123 | 3/1996 | Swann et al. . | |
| 5,562,277 | 10/1996 | Swann et al. . | |
| 5,873,569 | 2/1999 | Boyd et al. | 269/296 |

*Primary Examiner*—Robert C. Watson
*Attorney, Agent, or Firm*—Mark G. Bocchetti

[57] ABSTRACT

A work piece holding mechanism which provides multi position part holding capability to automatically sequentially hold and present a work pieces in multiple orientations for work thereon. The work piece holding mechanism includes two rotatable clamp means for clamping the work piece therebetween. Rotation of at least one of the rotary clamps is driven by a rotary drive mechanism, preferably a rotary air cylinder. The rotary air cylinder is provided with at least one fixed rotational stop. In addition, the rotary air cylinder may be provided with one or more actuatable intermediate stops. Rotation of the work piece can be accomplished by driving the rotary air cylinder to a predetermined position against either a fixed stop or an actuatable stop. Each of such stop positions results in a different orientation of the work piece and thus a different work plane on which the robot can operate. Loading of the work piece into the holding mechanism can be performed automatically by the robot with the robot controller also commanding the opposing clamps of the work holder to engage the work piece. Similarly, removal of the work piece from the holding mechanism can be automatically performed with the robot and robot controller.

10 Claims, 9 Drawing Sheets

MULTI POSITION PART HOLDER FOR ROBOTIC APPLICATIONS

FIELD OF THE INVENTION

The present invention relates generally to systems for holding work pieces and, more particularly, to systems capable of automatically holding work pieces in multiple positions for robotic applications.

BACKGROUND OF THE INVENTION

A variety of work piece holders are known in the prior art. Generally, these prior art work piece holders involve holding a work piece about an axis of rotation to present the work piece for a specific machine operation such as, for example, milling, polishing, truing, turning, etc.

U.S. Pat. No. 4,726,576 to Siniko teaches a work piece supporting the device which is manually operated to allow the user to adjust the position and/or orientation of a selected work piece. The device is affixed to a bench and defines a vertical pivot axis for a support serving to mount a chuck carrier for rotation about a first horizontal axis. The chuck in the carrier can support a work holder so as to allow for angular movement of the work holder about a second horizontal axis extending at right angles to the first horizontal axis.

U.S. Pat. No. 5,501,123 to Swann et al teaches an indexing apparatus that can be used to index a variety of different articles about an axis. In such manner, an article can be selectively rotated about the axis so that the article may be positioned in a predetermined angular position.

U.S. Pat. No. 5,562,277 to Swann et al teaches a modular vice-like work holding system utilizing dissimilar support members, each adapted to interchangeably support at least one vice-like clamping assembly in a plurality of work holding orientations relative to a support member.

The patents cited above all relate to a manually operated type of clamping mechanism used to securely hold parts presented for a machining operation such as, for example, a computer numerically controlled apparatus. Typically, these clamping mechanisms allow access by the CNC machine to the work piece at one specific angle and also one specific portion or surface of the work piece. The prior art fails to teach a work piece holder which can be automatically operated to represent a single work piece at multiple positions such that work can be performed by a robot on multiple surfaces of the work piece without manual intervention.

SUMMARY OF THE INVENTION

It is therefore an object of the present invention to provide a multi position part holding mechanism which can be used to automatically sequentially hold and present a part in multiple orientations for work thereon.

It is a further object of the present invention to provide a work piece holding device capable of automatically reorienting the work piece to sequentially present multiple work surfaces in generally the same plane for a robotic assembly operation.

Briefly stated, the foregoing and numerous other features, objects and advantages of the present invention will become readily apparent upon a reading of the detailed description, claims and drawings set forth herein. These features, objects and advantages are accomplished by providing a work piece holding mechanism including two rotatable clamp means for clamping the work piece therebetween. Rotation of at least one of the rotary clamps is driven by a rotary drive mechanism, preferably a rotary air cylinder. The rotary drive is provided with at least two predetermined and preferably fixed rotational end stops. In addition, the rotary drive may be provided with one or more actuatable intermediate stops. In such manner, rotation of the work piece can be accomplished by driving the rotary drive to a predetermined position against either a rotational end stop or an actuatable stop. Each of such stop positions results in a different orientation of the work piece and thus a different work plane on which the robot can operate. Loading of the work piece into the holding mechanism can be performed automatically by the robot with the robot controller also commanding the opposing clamps of the work holder to engage the work piece. Similarly, removal of the work piece from the holding mechanism can be automatically performed with the robot and robot controller.

DETAILED DESCRIPTION OF THE INVENTION

Figure 1:
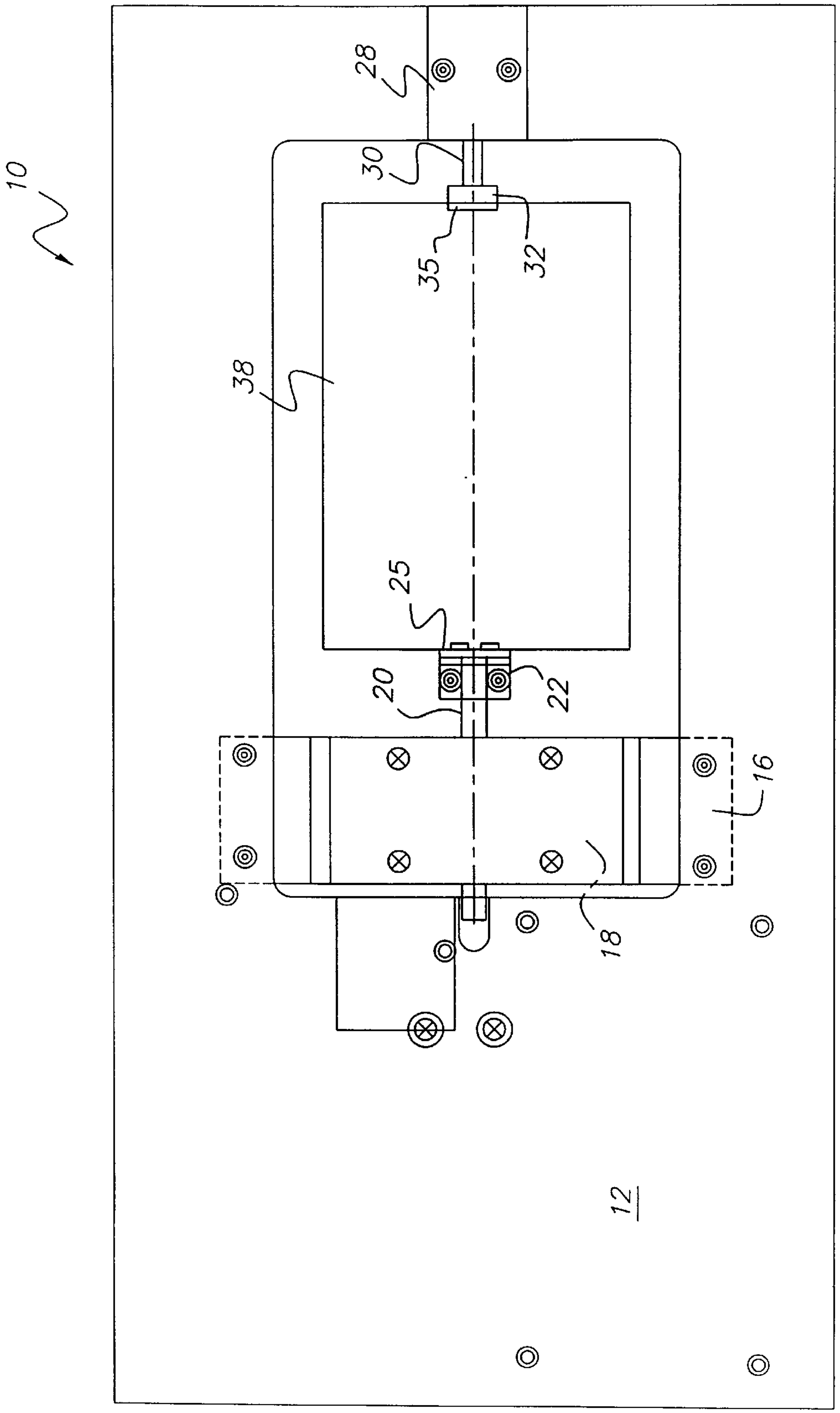
FIG. 1 is a top plan view of the work piece holding apparatus of the present invention with a work piece being held therein.
Figure 2:
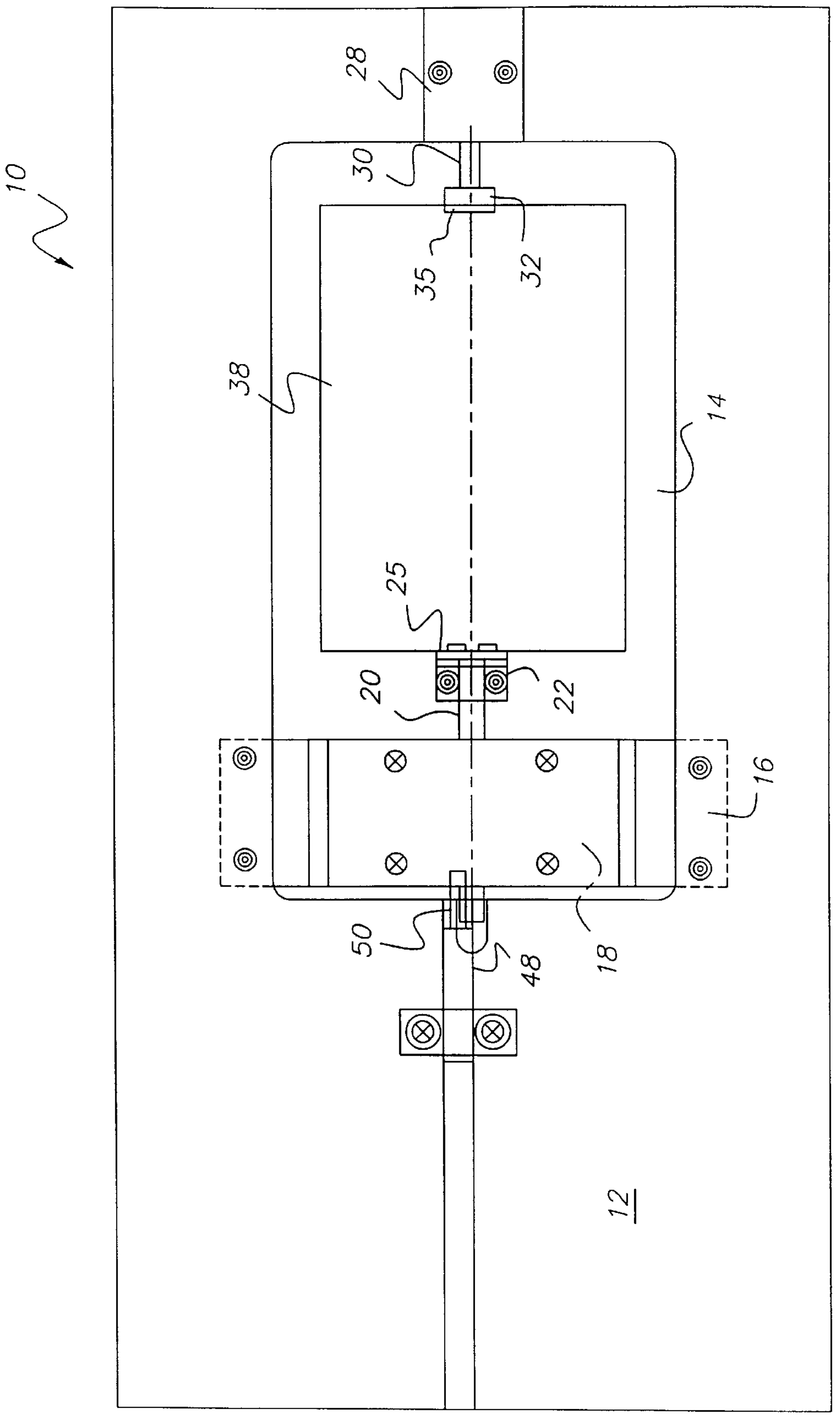
FIG. 2 is a bottom plan view of the work piece holding apparatus depicted in FIG. 1 with a work piece being held therein.
Figure 3:
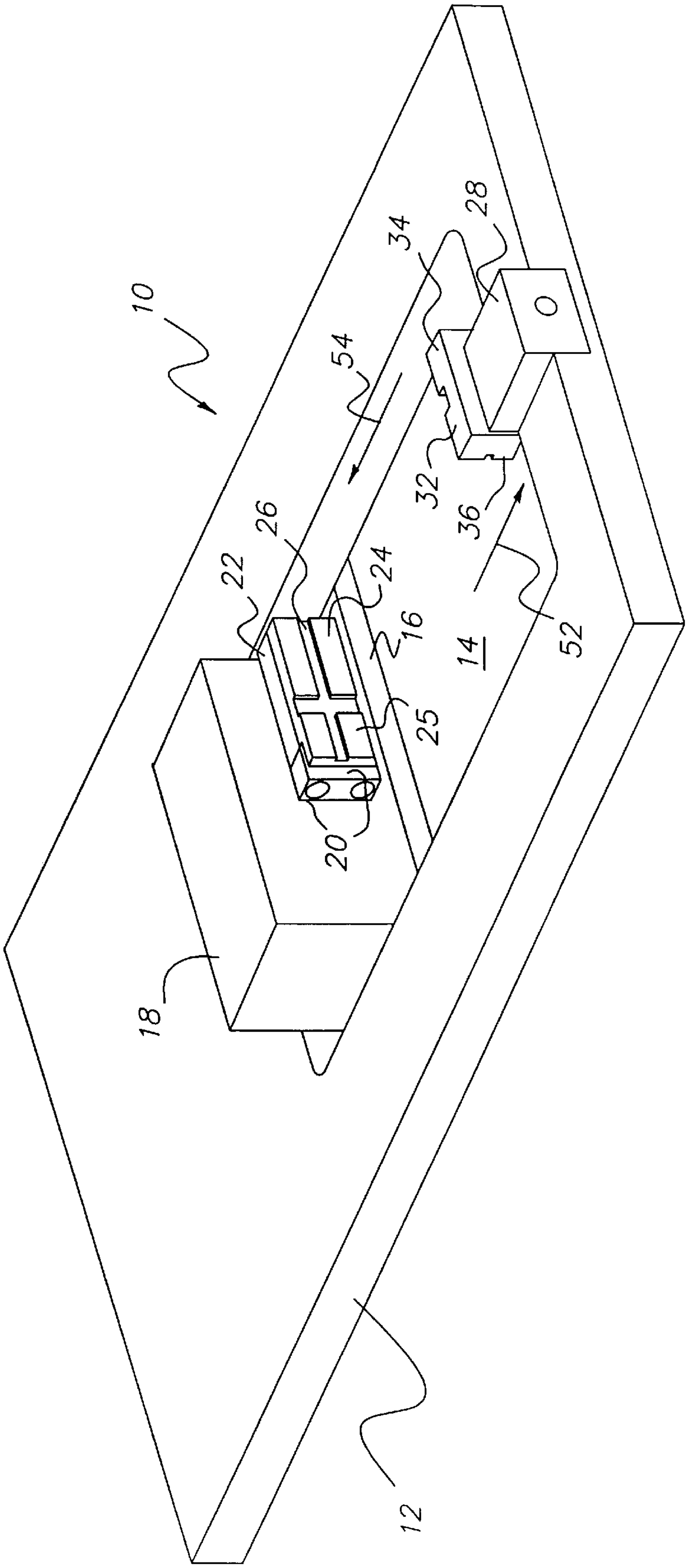
FIG. 3 is a perspective view of the work holding apparatus depicted in FIGS. 1 and 2.

Turning first to FIGS. 1, 2 and 3 there is shown the work piece holding apparatus 10 of the present invention. The work piece holding apparatus 10 includes a platform 12 adapted to be mounted to a robotic assembly table (not shown). There is a work opening 14 through platform 12. Attached to platform 12 at one end of work opening 14 is support bracket 16. Mounted on support bracket 16 is rotary air cylinder 18 including a shaft 20 extending therefrom. Affixed to shaft 20 is a first work piece support 22. The front face 24 of first work piece support 22 includes a reference surface 25 having at least one reference feature 26 and preferably two crossing reference features 26 therein. Reference features 26 are preferably channels. Rotary air cylinder 18 is pneumatically actuated such that it can be rotated in either direction thereby rotating first work piece support 22 affixed to shaft 20.

Positioned on the opposite side of work opening 14 from rotary air cylinder 18 is air cylinder 28. Extending from pneumatic cylinder 28 is piston 30. Attached to the pistol end of piston 30 is second work piece support 32. The front face 34 of second work piece support 32 includes a reference surface 35 having at least one reference feature 36 and preferably two crossing reference features 36 therein. Reference features 36 are preferably channels. Through actuation of pneumatic cylinder 28, piston 30 can be moved in a reciprocating motion. In such manner, second work piece support 32 can be driven toward or away from first work piece support 22 to either engage a work piece 38 therebetween or release a work piece 38 therefrom.

Figure 4:
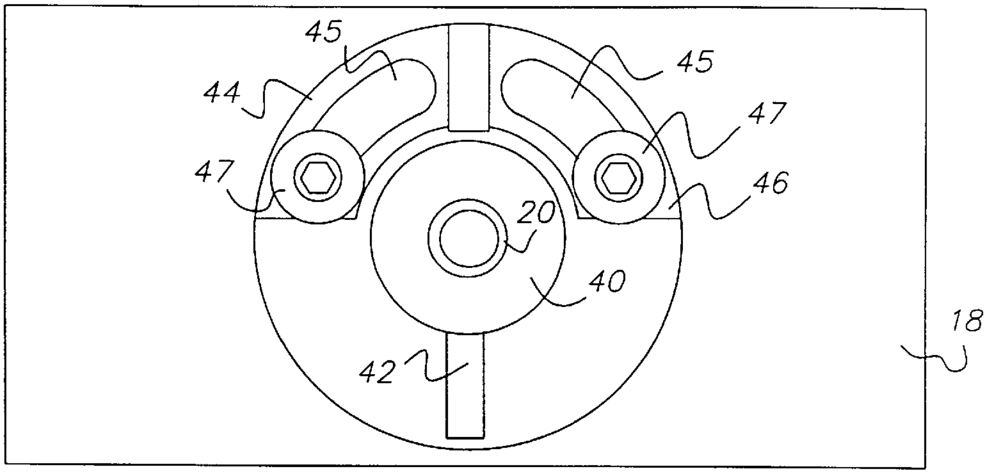
FIG. 4 is a rear elevational view of the rotary air cylinder.
Figure 5:
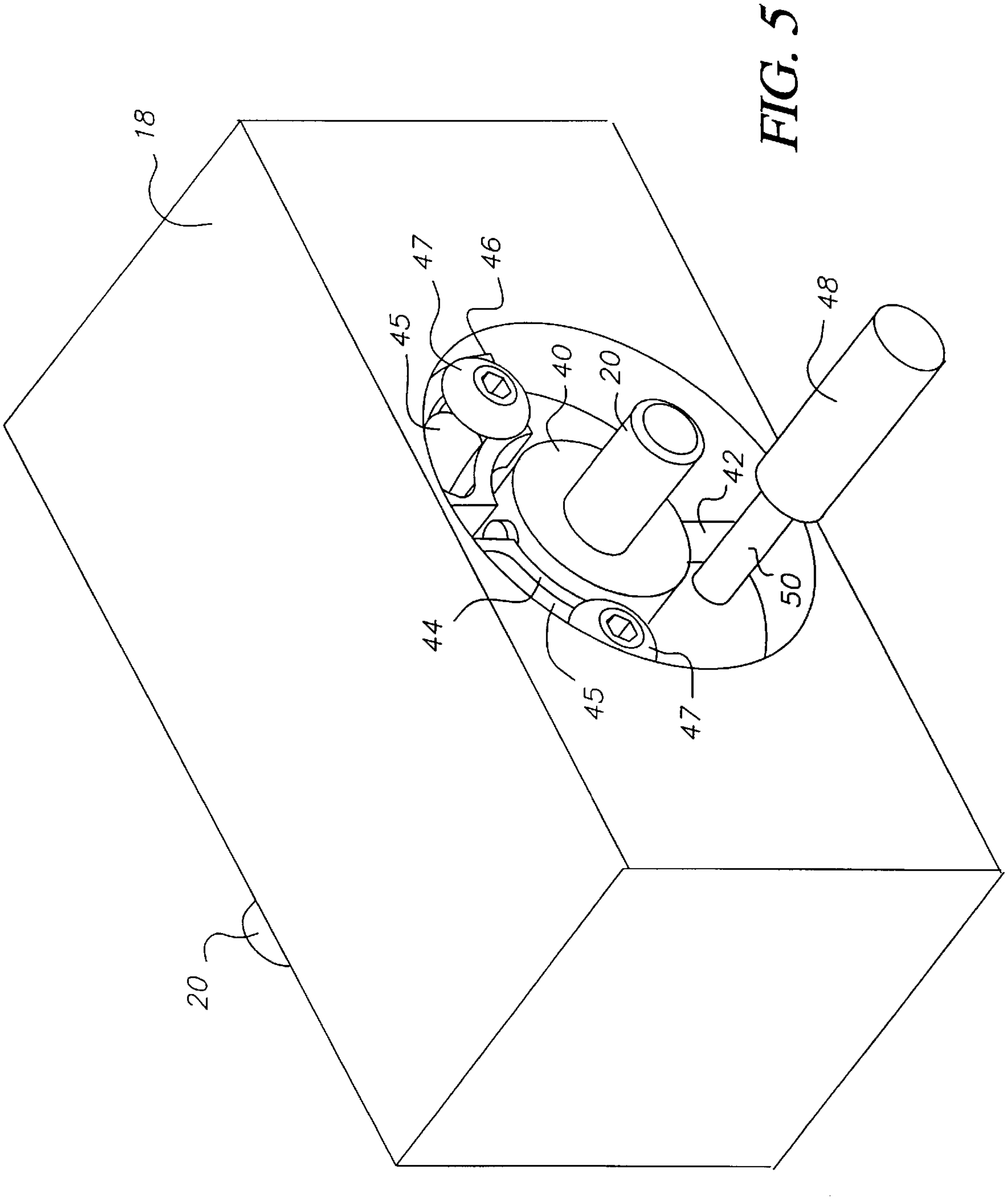
FIG. 5 is a rear perspective view of the rotary air cylinder shown with the intermediate stop in actuated position.

Looking next at FIGS. 4 and 5, there is shown a rear elevational view and a perspective view, respectively, of rotary air cylinder 18. Mounted to shaft 20 of rotary air cylinder 18 is rotor 40. Extending through rotor 40 and shaft 20 is pin 42. Affixed to the housing of rotary air cylinder 18 are chocks 44, 46 which serve as fixed rotational end stops. Rotation of rotary air cylinder 18 as depicted is thus limited in the clockwise direction by interference of pin 42 engaging chock 44. Rotation of rotary air cylinder 18 in the counter-clockwise direction is limited by pin 42 engaging chock 46. Chocks 44 and 46 are positioned to present a work piece 38 at two predetermined orientations (e.g. 180° of rotation apart) for work thereon by a robotic arm. Chocks 44, 46 may be mounted to the housing of rotary air cylinder 18 so that the position of each chock 44, 46 can be adjusted. For example, as depicted, each chock 44, 46 includes a slot 45 therein. Machine screws 47 extending through slots 45 are used to fix the position of chocks 44, 46 such that the position of each chock 44, 46 can be independently adjusted.

Figure 6:
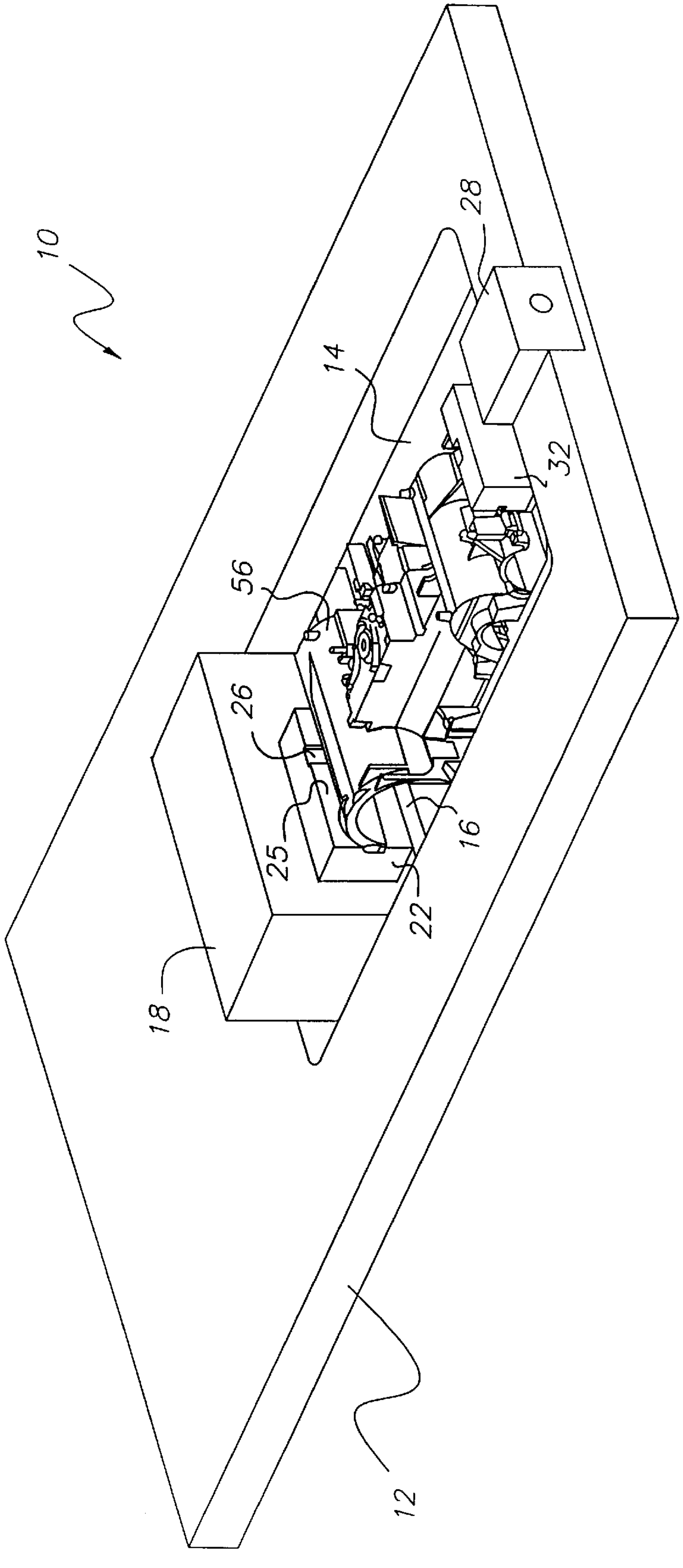
FIG. 6 is a perspective view of the work piece holding apparatus of the present invention holding an exemplary work piece in a first orientation.
Figure 7:
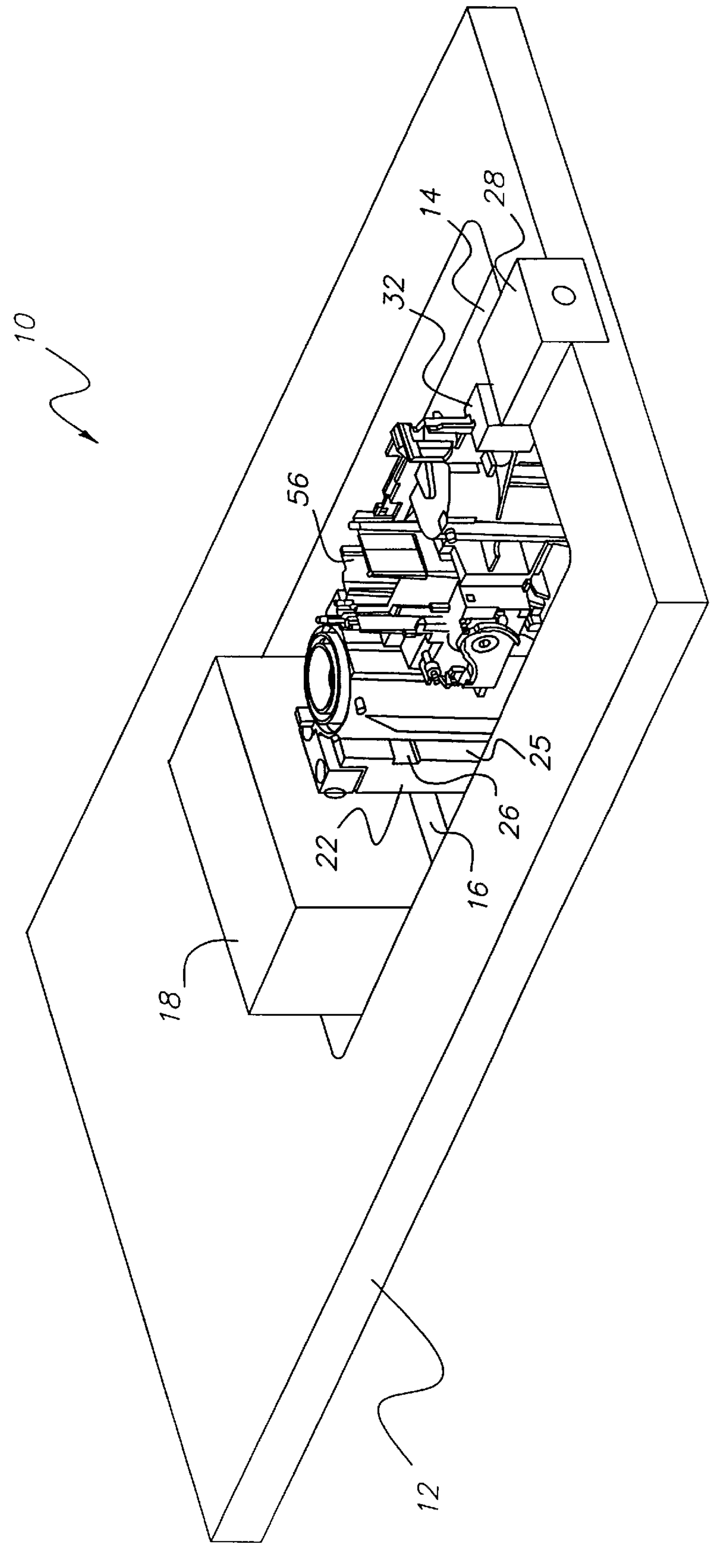
FIG. 7 is a perspective view of the work piece holding apparatus depicted in FIG. 6 holding the same exemplary work piece in a second orientation.

Mounted to the bottom surface of platform 12 is spring loaded pneumatic cylinder 48. Pneumatic cylinder 48 includes a piston 50 which can be extended toward rotary air cylinder 18 such that it will engage pin 42 during rotation of rotary air cylinder 18 to thereby provide an intermediate position and stop. In such manner, rotary air cylinder 18 is provided with a third definitive rotational stop and thus a third predetermined orientation (e.g. 90° of rotation) for presenting a work piece 38 held between first and second work piece supports 22, 32. In such manner, the work piece holding apparatus 10 as depicted in FIGS. 5, 6 and 7 has three specific orientation which can be automatically and sequentially achieved for presenting work piece 38 for work thereon by a robotic arm. It would, of course, be possible to use additional spring loaded pneumatic cylinder 38 to create additional intermediate stops.

In the operation of the work piece holding apparatus 10 of the present invention (referring to FIGS. 1 through 3), in order to load the work piece 38 therein, air cylinder 28 must be actuated to retract piston 30 in the direction of arrow 52. Rotary air cylinder 18 must be rotated to a reference position, preferably against one of the stops 44, 46. In such manner, first work piece support 22 will reside in an initial position presenting reference channel 26 in the orientation for receiving a work piece 38 therein. Similarly, second work piece support 32 resides in a corresponding initial rotational orientation for receiving an opposite side of the work piece 38 in reference channel 36. Because piston 30 is free to turn in air cylinder 28, second work piece support 32 will rotate in unison with first work piece support 22 when a work piece 38 is retained between first work piece support 22 and second work piece support 32. With that in mind, it is preferred that a reference pin (not shown) extend from platform 12 to engage a reference orifice (not shown) in second work piece support 32 when second work piece support 32 is in a fully retracted position to ensure that second work piece support 32 is in the required initial position for the robot controller (not shown) to actuate. The work piece 38 is loaded by the robot and held in position by the robot while the robot controller drives piston 30 and thus second work piece support 32 in the direction indicated by arrow 54. In such manner, the work piece 38 is clamped between first work piece support 22 and second work piece support 32. Reference channels 26, 36 should be specifically designed to receive the side edge geometry of a specific work piece 38 and hold the work piece 38 at a predetermined X-Y coordinates. This can be accomplished, for example, by having two crossing reference channels 26, 36 on first work piece support 22 and second work piece support 32, respectively, which are configured such that one channel 26, 36 receives a side edge of a specific work piece 38 and the crossing channel 26, 36 receives an extending feature of the specific work piece 38.

Figure 8:
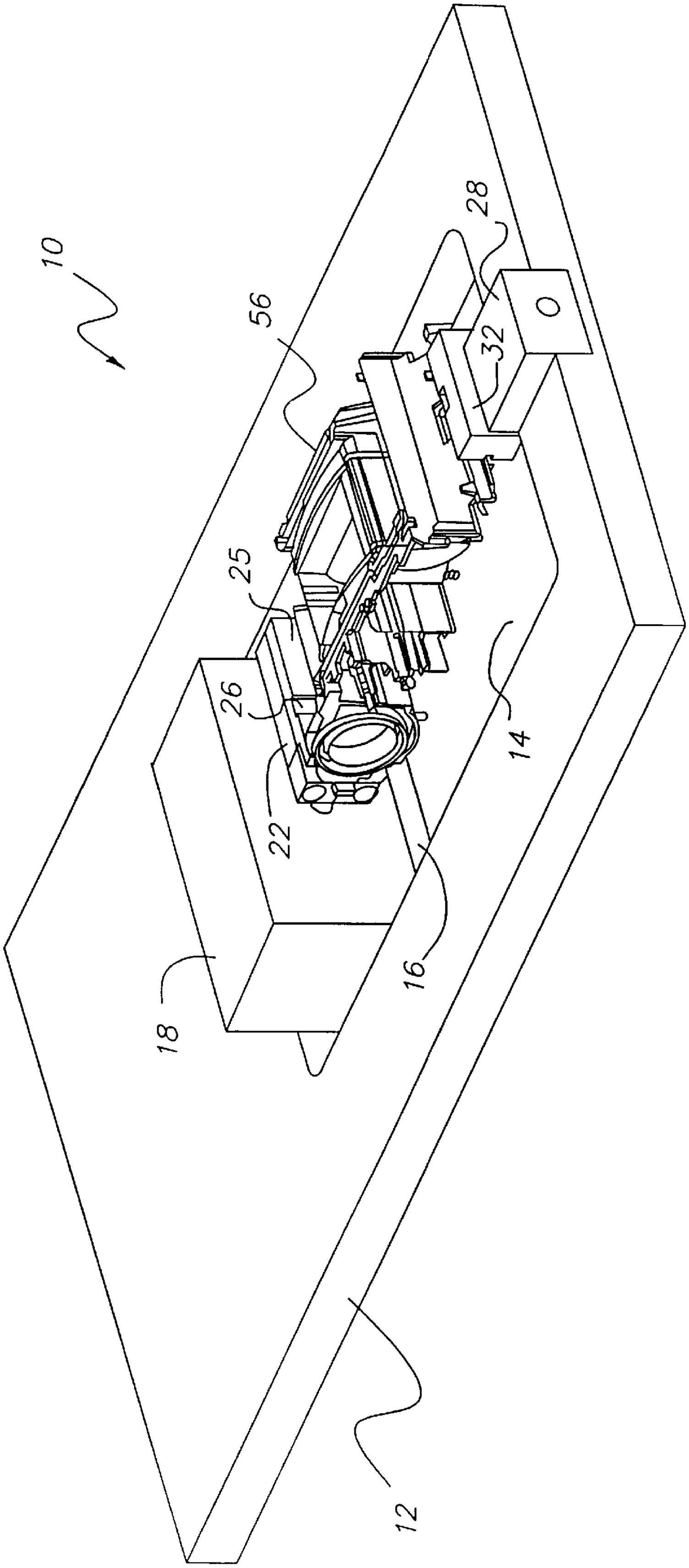
FIG. 8 is a perspective view of the work piece holding apparatus depicted in FIG. 6 holding the same exemplary work piece in a third orientation.

Looking at FIGS. 6 through 8 there can be seen the work piece holding apparatus 10 of the present invention holding an exemplary work piece 56 therein. The exemplary work piece 56 shown is a camera body. In FIG. 6, the camera body 56 has been automatically rotated to a horizontal orientation with pin 42 against chock 44. In FIG. 7, the camera body 56 has been automatically rotated to a vertical orientation with pin 42 against piston 50. In FIG. 8, the camera body 56 has been rotated to a generally horizontal orientation 180° from the orientation depicted in FIG. 6 with pin 42 against chock 46. Thus, the work piece holding apparatus 10 of the present invention has automatically and sequentially reoriented the exemplary work piece 56 to present three different surfaces of the work piece 56 for work thereon by a robotic arm. In such manner, the work piece holding apparatus 10 of the present invention can hold the main body of an assembly allowing a robot to build a subassembly thereon of the final product. The control system which operates the robotic arm also operates the valves, motors, or air cylinders needed for a loading and holding of the work piece, rotation of the work piece to change the angles and orientation during assembly, and the automatic unload of the finished subassembly.

Figure 9:
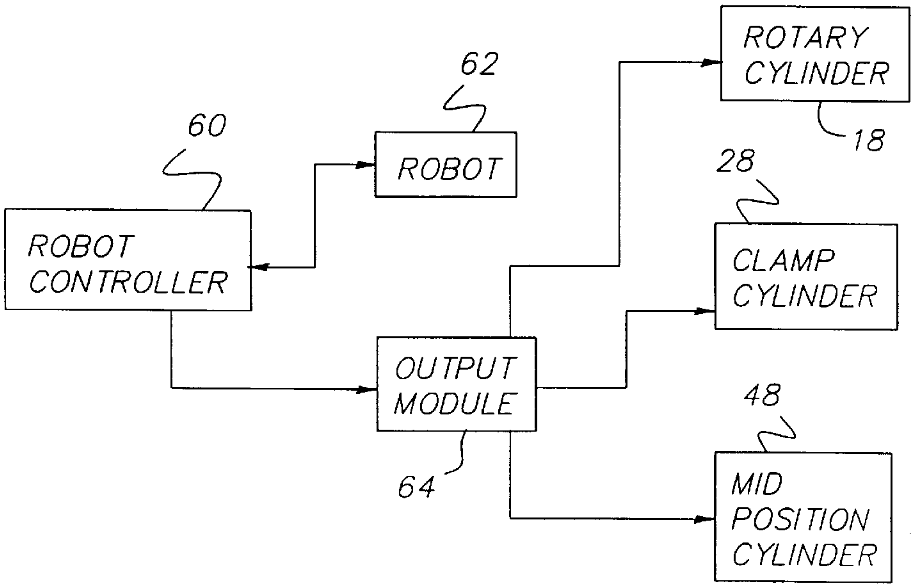
FIG. 9 is a schematic of the interface of the components of the work piece holding apparatus, a robot controller, and a robot.

Looking next at FIG. 9, there is depicted a schematic of the interface of the components of the embodiment of the present invention depicted in FIGS. 1 and 2 in combination with a robot controller 60 which controls a robotic arm 62. Robot controller 60 also sends control signals via output module 64 to rotary air cylinder 18, pneumatic cylinder 28 and spring loaded pneumatic cylinder 48. Output module 64 may be any of a variety of devices known by those skilled in the art for use energizing/de-energizing valves. Output module 64 may be generally described as an I/O signal relay. For example, output module 64 may be a ODC5Q as manufactured by OPTO-22 of Temecula, Calif. Thus, the robot controller 60 controls the delivery of a work piece 38 to the work piece holding apparatus 10. The robot controller 60 further controls the actuation of pneumatic cylinder 28 to clamp the work piece 38 between the first work piece support 22 and the second work piece support 32. The robot controller 60 then can control the rotation of the work piece 38 through operation of rotary air cylinder 18 to drive rotary cylinder 18 against chocks 44, 46. The robot controller 60 can further control the actuation of spring loaded pneumatic cylinder 48 to actuate piston 50 to provide an intermediate hard stop for rotary air cylinder 18.

Figure 10:
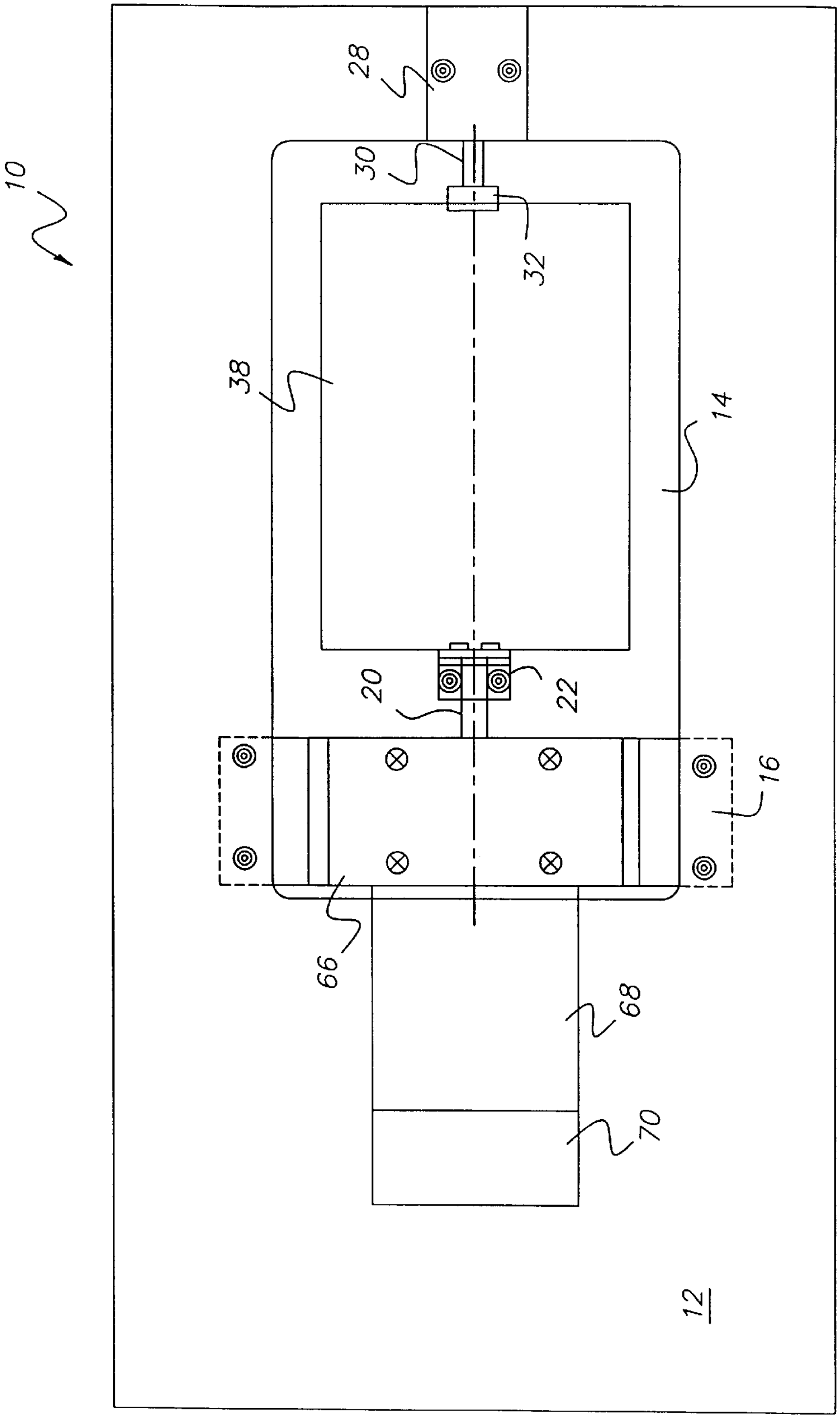
FIG. 10 is a top plan view of an alternative embodiment of the present invention depicted in FIGS. 1, 2 and 3.

The preferred embodiment of the present invention as shown in FIGS. 1, 2 and 3 has been depicted herein using a rotary air cylinder 18 driven against chocks 44, 46 and an intermediate hard stop created by the actuation of piston 50. This is a relatively simple and straight forward way of practicing the present invention. The use of hard stops ensures that the positioning expected by the robot controller is achieved. However, other rotational drive mechanisms can be used in the practice of the present invention with and without the necessity for hard stops. As shown in FIG. 10, for example, rotary air cylinder 18 can be replaced with a gearbox 66, a motor 68 and an encoder 70. Motor 68 could be, for example, a stepper motor or a servomotor. A stepper motor will rotate and step to the desired angular orientations for presenting a work piece 38 for operation thereon by a robot thereby providing the required rotational stop. A servomotor allows for locking the angular orientation of the first work piece support 22 to provide programmable, pedetermined rotational stops at the desired positions so that the work piece 38 would not move during work thereon by a robot. The locking of the rotational stop positions could be enhanced by providing a worm gear interface between the servomotor and the rotating shaft on which the first work piece support 22 is supported. Similarly, a rotary indexer or an indexing plate could be employed to supply the rotational stops (both end and intermediate). Other rotary drive systems which could be used in the practice of the work piece holding apparatus 10 of the present invention include hydraulic motors, rotary actuators and rotary solenoids. Further, air cylinder 28 and spring loaded pneumatic cylinder 48 (see FIG. 5) could be replaced with a linear solenoid or a hydraulically operated cylinder.

From the foregoing, it will be seen that this invention is one well adapted to attain all of the ends and objects herein above set forth together with other advantages which are apparent and which are inherent to the invention.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

PARTS LIST

10 work piece holding apparatus
12 platform
14 work opening
16 support bracket
18 rotary air cylinder
20 shaft
22 first work piece support
24 front face
25 reference surface
26 reference channel
28 air cylinder
30 piston
32 second work piece support
34 front face
35 reference surface
36 reference feature
38 work piece
40 rotor
42 pin
44 chock
45 slots
46 chock
47 machine screws
48 spring loaded pneumatic cylinder
50 piston
52 arrow
54 arrow
56 exemplary work piece
60 robot controller
62 robotic arm
64 output module
66 gearbox
68 motor
70 encoder

What is claimed is:

1. A multiple position work piece holding device comprising:

(a) a frame having a work opening therein;

(b) a rotary drive mechanism supported from said frame adjacent a first side of said work opening;

(c) a first work piece support affixed to a shaft extending from said rotary drive mechanism;

(d) an air cylinder supported on said frame on a second side of said work opening opposite said first side, said an cylinder including a piston, said air cylinder being actuatable to drive said piston toward and away from said first work piece support;

(e) a second work piece support affixed to said piston, said first and second work piece supports forming a clamp for holding a work piece therebetween;

(f) control means for controlling rotation of said rotary drive mechanism; and (g) at least two stops for automatically stopping rotation of said rotary drive mechanism to automatically present at least two different orientations of the work piece for work thereon.

2. A multiple position work piece holding device comprising:

(a) a rotary drive including a rotatable shaft;

(b) a first work piece support affixed to said rotatable shaft;

(c) a clamping piston positioned opposite said first work piece support;

(d) a second work piece support affixed to said piston, said first and second work piece supports forming a clamp for holding a work piece therebetween, said clamping piston being actuatable to drive said piston toward and away from said first work piece support;

(e) control means for controlling rotation of said rotary drive mechanism; and (f) at least two stops for automatically stopping rotation of said rotary drive mechanism to automatically present at least two different orientations of the work piece for work thereon.

3. A multiple position work piece holding device as recited in claim 2 further comprising:

(a) at least one reference surface on in said first work piece support adapted to receive one side of a predetermined work piece; and (b) at least one reference surface on said second work piece support adapted to receive an opposite side of the predetermined work piece.

4. A multiple position work piece holding device as recited in claim 2 wherein:

said at least two stops each position a work piece to present a different surface of the work piece at a generally identical work plane for work thereon by a robotic arm.

5. A multiple position work piece holding device as recited in claim 2 wherein:

there are at least three stops for automatically stopping rotation of said rotary drive mechanism to automatically present at least three different orientations of the work piece for work thereon, each of the at least three orientations presenting a different surface of the work piece at a generally identical work plane for work thereon by a robotic arm.

6. A multiple position work piece holding device as recited in claim 2 wherein:

said rotary drive is a rotary air cylinder.

7. A multiple position work piece holding device as recited in claim 2 wherein:

said rotary drive is a stepper motor.

8. A multiple position work piece holding device as recited in claim 2 wherein:

said rotary drive is a servomotor.

9. A multiple position work piece holding device as recited in claim 2, said at least two stops comprising:

(a) a pin extending from said rotatable shaft; and (b) at least two chocks limiting rotation of said rotatable shaft by interfering with said pin.

10. A multiple position work piece holding device as recited in claim 2, said at least two stops comprising:

(a) a pin extending from said rotatable shaft;

(b) a first chock limiting rotation of said rotatable shaft in a clockwise direction by interfering with said pin; and (c) a second chock limiting rotation of said rotatable shaft in a counterclockwise direction by interfering with said pin.

* * * * *